(12) United States Patent
Ellis

(10) Patent No.: US 7,247,026 B1
(45) Date of Patent: Jul. 24, 2007

(54) PRACTICE DEVICE TO ENABLE CHILDREN TO SIMULATE SKATEBOARDING

(76) Inventor: Robert Gary Ellis, 19543 Grandview Dr., Topanga, CA (US) 90290

( * ) Notice: Subject to any disclaimer, the term of this patent is extended or adjusted under 35 U.S.C. 154(b) by 824 days.

(21) Appl. No.: 10/622,267

(22) Filed: Jul. 17, 2003

(51) Int. Cl.
*G09B 19/00* (2006.01)
(52) U.S. Cl. .................................. 434/247
(58) Field of Classification Search ........... 434/247, 434/253, 255; 482/142, 143, 146, 147; 280/11.27, 280/11.28, 809, 811, 87.041, 87.042
See application file for complete search history.

(56) References Cited

U.S. PATENT DOCUMENTS

| | | | |
|---|---|---|---|
| 3,655,211 A | 4/1972 | Bollettieri | |
| 3,862,768 A | 1/1975 | England | |
| 4,270,764 A | 6/1981 | Yamada | |
| 5,044,250 A | 9/1991 | Beyer | |
| 5,267,743 A | 12/1993 | Smisek | |
| 5,460,558 A | 10/1995 | Woodstock | |
| D379,647 S | 6/1997 | Levinthal | |
| D417,250 S | 11/1999 | Colin | |
| 6,059,307 A | 5/2000 | Western | |
| 6,203,037 B1 * | 3/2001 | Wilson et al. | 280/87.042 |
| 6,290,249 B1 | 9/2001 | Wolf | |
| D457,587 S | 5/2002 | Wolf | |
| 6,543,769 B1 | 4/2003 | Podoloff | |
| 6,646,363 B2 * | 11/2003 | Kylander et al. | 310/194 |
| 6,802,636 B1 * | 10/2004 | Bailey, Jr. | 362/555 |
| 6,805,658 B2 * | 10/2004 | Desberg et al. | 482/146 |
| 6,857,641 B2 * | 2/2005 | Bobrowicz | 280/14.21 |
| 6,929,478 B1 * | 8/2005 | Spencer et al. | 434/247 |
| 6,942,487 B2 * | 9/2005 | Corbalis | 434/247 |
| 7,070,192 B1 * | 7/2006 | Steiner | 280/87.042 |
| 2002/0121752 A1 | 9/2002 | Gille | |
| 2002/0153686 A1 * | 10/2002 | Todd | 280/87.042 |
| 2002/0163144 A1 * | 11/2002 | Guerra | 280/11.27 |
| 2003/0017922 A1 | 1/2003 | Sachs | |
| 2003/0160411 A1 * | 8/2003 | Turner et al. | 280/87.042 |
| 2003/0215777 A1 * | 11/2003 | Loveless | 434/247 |

* cited by examiner

*Primary Examiner*—Kurt Fernstrom
(74) *Attorney, Agent, or Firm*—Thomas I. Rozsa; Tony D. Chen

(57) ABSTRACT

A practice device to enable children to simulate skateboarding in a safe manner so the children can practice sliding the practice device on a surface and balancing themselves on the device. The device comprises a center section, a front section and a rear section where the front and rear sections are at an angle to the center section and the bottom surface of the device is entirely smooth to facilitate the movement of the device on a surface. The upper surface of the device has a lowered interior area surrounded by a circumferential ridge.

16 Claims, 2 Drawing Sheets

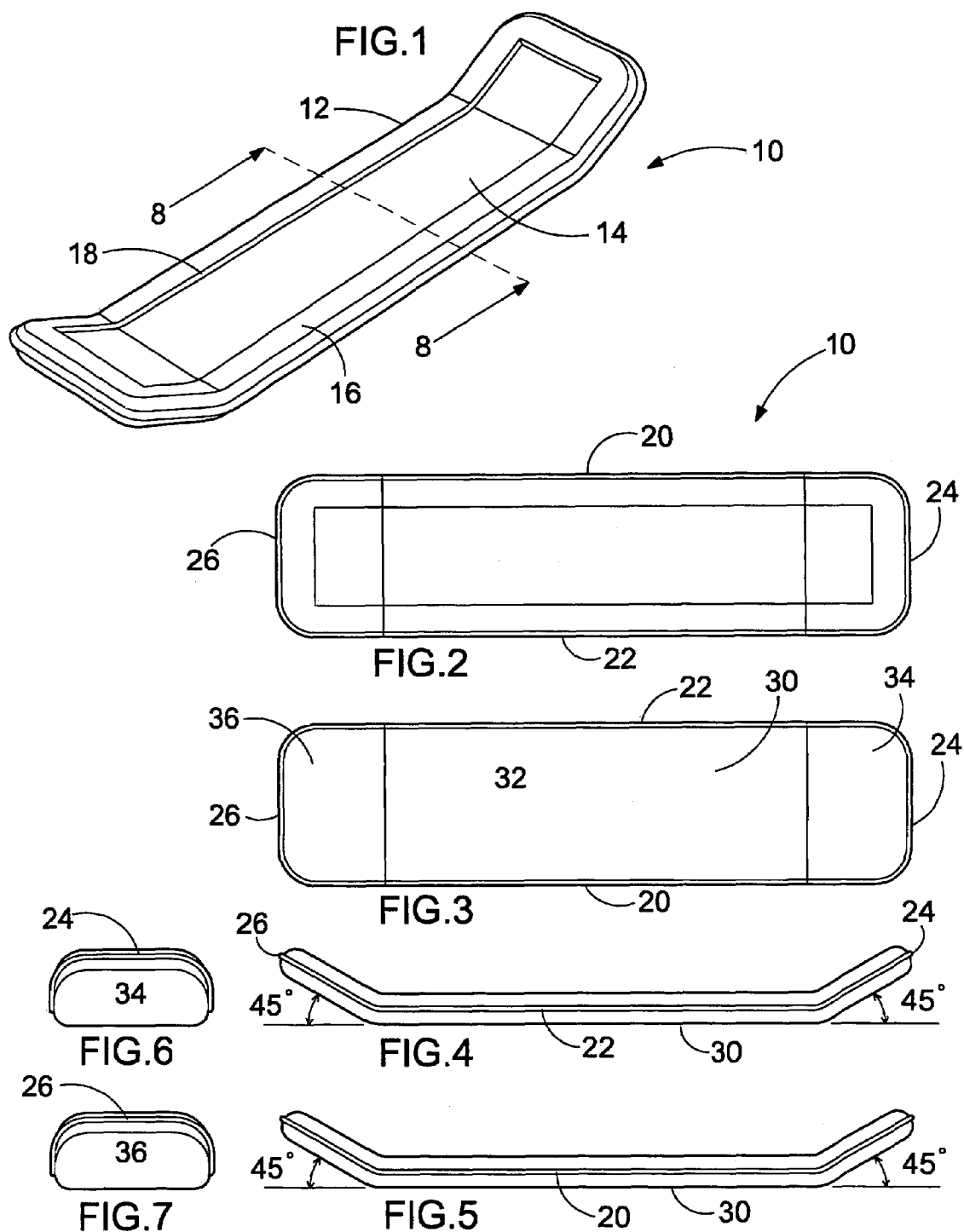

PRACTICE DEVICE TO ENABLE CHILDREN TO SIMULATE SKATEBOARDING

BACKGROUND OF THE INVENTION

1. Field of the Invention

The present invention relates to the field of sporting goods and in particular, to skateboards. The present invention also relates to the field of practice devices which enable a child to learn how to use a skateboard.

2. Description of the Prior Art

In general, skateboards and other similar sporting goods such as skis are known in the prior art. The following 14 patents and published patent applications are the closest prior art of which the inventor is aware:

1. U.S. Pat. No. 3,655,211 issued to Bollettieri on Apr. 11, 1972 for "Double Bend Stave" (hereafter the "Bollettieri Patent");
2. U.S. Pat. No. 3,862,768 issued to England on Jan. 28, 1975 for "Rollable Fulcrum Balancing Board Recreational And Exercise Device Provided With non-Linear Stabilization Features" (hereafter the "England Patent");
3. U.S. Pat. No. 4,270,764 issued to Yamada on Jun. 2, 1981 for "Noisemaker For Skateboard" (hereafter the "Yamada Patent");
4. U.S. Pat. No. 5,044,250 issued to Beyer on Sep. 3, 1991 for "Drumstick With Sounding Pellets" (hereafter the "Beyer Patent");
5. U.S. Pat. No. 5,267,743 issued to Smisek on Dec. 7, 1993 for "Low Profile Skateboard" (hereafter the "Smisek Patent");
6. U.S. Pat. No. 5,460,558 issued to Woodstock on Oct. 24, 1995 for "Surfboard Foot Saddle" (hereafter the "Woodstock Patent");
7. United States Patent No. Des. 379,647 issued to Levinthal on Jun. 3, 1997 for "Pair Of Ski" (hereafter the "Levinthal Patent");
8. United States Patent No. Des. 417,250 issued to Colin on Nov. 30, 1999 for "Gliding Board" (hereafter the "Colin Patent");
9. U.S. Pat. No. 6,059,307 issued to Western on May 9, 2000 for "Skateboard Deck And Method For Making The Same" (hereafter the "Western Patent");
10. U.S. Pat. No. 6,290,249 B1 issued to Wolf on Sep. 18, 2001 for "Snow-Gliding Apparatus" (hereafter the "Wolf Patent");
11. United States Patent No. US D457,587 S issued to Wolf on May 21, 2002 for "Snow-Gliding Apparatus" (hereafter the "Wolf Patent");
12. United States Patent Application Publication No. US 2002/0121752 A1 by inventor Gille published on Sep. 5, 2002 for "Snowskate And Snow Scooter" (hereafter the "Gille Patent");
13. United States Patent Publication No. US 2003/017832 A1 by inventor Sachs published on Jan. 23, 2003 for "Recreational Balancing Apparatus" (hereafter the "Sachs Patent");
14. U.S. Pat. No. 6,543,769 B1 issued to Podoloff on Apr. 8, 2003 for "Snowboard Apparatus" (hereafter the "Podoloff Patent").

The Bollettieri Patent discloses staves which are used as skis on snow and water. The staves have substantially equal bends at their front and rear ends The device has several longitudinally extending grooves 17 which serve the purpose of skis.

The England Patent discloses a rollable fulcrum and essentially is a device which is in the shape of a Mexican sombrero hat having a ball in the center on which the individual balances. This patent shows an exercise type device.

The Yamada Patent discloses a noisemaker for use in conjunction with a skateboard but the noisemaking device does not consist of internal pebbles or sand within the structure of the device which makes noise as the device is moved across a carpet. This device basically creates noise through mechanical structures as illustrated.

The Beyer Patent is a drumstick with sound pellets.

The Smisek Patent is a low profile skateboard and the essential feature is having a recess to receive the wheels of the skateboard so that the skateboard rests much lower to the ground than conventional prior art skateboards. However, referring to FIG. 4 it can be seen that the skateboard has front and back ends that are put at an angle to the horizontal portion of the board and the angle, however, is substantially less than 45 degrees.

The Woodstock Patent discloses a surfboard having a foot saddle to prevent the surfer from sliding off the back end of the board. Specifically referring to Column 2, line 30, the patent states "The foot saddle 10 consists of a structure 22 for maintaining one foot 24 of a surfer 26 in a stationary position upon the deck near the tail end of the surfboard and help prevent the surfer's foot 24 from inadvertently sliding off the surfboard."

The Levinthal Patent discloses a design for a ski. The design which can best be seen in FIG. 5 in cross section shows having arcuately shaped extending upward front and rear ends and a generally upwardly extending arcuate shaped center section.

The Colin Patent is also a design patent for the shape of a gliding board.

The Western Patent discloses the concept of a skateboard deck and method for making the same. The patent does show the concept of having a horizontal center section and then having upwardly extending front and rear ends although the angle is only 18 degrees at one end and 15 degrees at the other end.

The Wolf Patent discloses a snow gliding apparatus which includes an elongated member having an intermediate portion positioned between a pair of upturned end portions. The end portions are rounded and do not have a sharp 45 degree angle. Further, there are a multiplicity of lower grooves 26 and 36.

The published Gille Patent Application discloses a snowskate and snow scooter.

The published Sachs Patent Application discloses a device which is a recreational balancing apparatus which comprises a frame defining a horizontal opening therein, and a balancing board mounted on a joint assembly.

The Podoloff Patent discloses a snowboard apparatus which is a simulator for snowboarding and skateboarding.

None of the prior art patents teach a simple effective device for enabling children to learn how to use a skateboard in a safe and secure manner. There is a significant need for such an invention.

SUMMARY OF THE INVENTION

The present invention is a practice device to enable children to simulate skateboarding in a safe manner so the children can practice sliding the practice device on a surface and balancing themselves on the device.

It has been discovered, according to the present invention, that a board made of plastic which has a flat and smooth lower surface and upturned front and rear ends provides a safe and effective device to enable children to simulate skateboarding on a smooth surface such as carpets, a lawn, dirt, sand and even a bed.

It has further been discovered, according to the present invention, that if the front and rear ends of the device are upturned at an angle between 30 degrees and 50 degrees to the horizontal with the preferred angle being 45 degrees, then the device will not flip over.

It has also been discovered, according to the present invention, that if the device further comprises a hollow interior which contains items such as beads or sand, the beads or sand will simulate a wave noise as the practice device is moved as the child plays and practices on the device.

It has additionally been discovered, according to the present invention, that if the top surface of the device comprises a lowered center section and a circumferential ridge running along the external circumference of the device on its top surface and extending inwardly to the lower section, then the child can place his/her feet transverse to the board so that the balls of the child's feet or the heels of the child's feet can connect with the exterior ridge portion so that the child gets a better grip on the board and this further assists the child in simulating skateboarding.

It is therefore an object of the present invention to provide a practice device which has a flat and smooth lower surface and an upturned front and rear surface, preferably at an angle between 30 degrees and 50 degrees to the horizontal at both the front and the rear end so that the device enables children to safely practice skateboarding while sliding the device on a smooth surface such as carpets, a lawn, dirt, sand, and even a bed.

It is a further object of the present invention to provide additional sound effects within the device so that the device simulates a wave motion to further provide additional enjoyment to the child as the child practices skateboarding on the practice device.

It is an additional object of the present invention to provide supporting balancing means on the upper surface of the practice device so that the child can place his or her feet transverse to the longitudinal upper surface of the device and obtain a more secure grip for the balls of the child's feet or the heels of the child's feet to further practice and simulate skateboarding.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention practice device;

FIG. 2 is a top plan view of the present invention practice device;

FIG. 3 is a bottom plan view of the present invention practice device;

FIG. 4 is a left side view of the present invention practice device as viewed from the left side;

FIG. 5 is a side elevational view of the present invention practice device as viewed from the right side;

FIG. 6 is a front elevational view of the present invention practice device;

FIG. 7 is a rear elevational view of the present invention practice device;

DETAILED DESCRIPTION OF THE PREFERRED EMBODIMENTS

Figure 8:
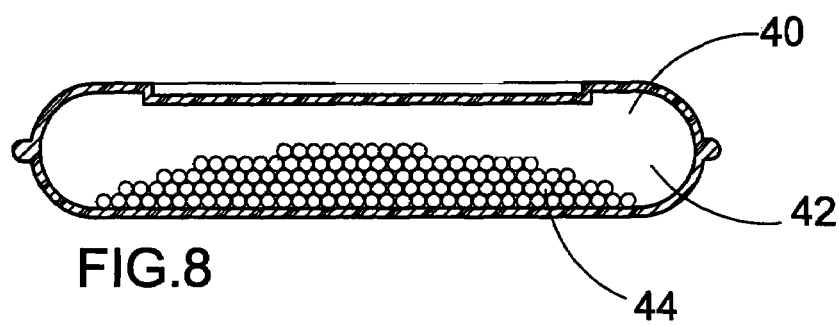
FIG. 8 is a cross sectional view taken along line 8-8 of FIG. 1 of the present invention practice device.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 7, there is shown at 10 the present invention practice device. In the preferred embodiment, the practice device is generally elongated with a top surface 12 having a depressed or lowered section 14 in the interior portion of the upper surface 12 and a circumferential ridge 16 which extends along the entire upper surface 12 and extends inwardly from the exterior edge until it joins the lowered section 14. A short vertical wall 18 is created between the interior edges of the ridge 16 and the lower section 14. While in the preferred embodiment the ridge extends along the entire circumference as shown in FIG. 1, it is also within the spirit and scope of the present invention to have the ridge 16 only extend along at least a portion of the lengthwise edges of the upper surface of the device 10.

Referring to FIG. 2, the device has a first lengthwise edge 20, and a parallel and oppositely disposed second lengthwise edge 22, a front or first widthwise edge 24 and a second or rear widthwise edge 26.

Referring to the bottom plan view of FIG. 3, it can be seen that the lower surface of the device 30 is completely smooth and flat. This can also be seen by looking at the side views of FIGS. 4 and 5. The center section of the lower surface 32 is completely flat and is bounded by the center portion lengthwise edges 20 and 22. As shown in FIGS. 4 and 5, the front edge 24 and the rear edge 26 are upturned from the lower surface 30. The preferred angle for both the front and rear edges are 45 degrees as shown in FIGS. 4 and 5. However, it is within the spirit and scope of the present invention to have the angle extend between 30 degrees and 50 degrees with 45 degrees being the preferred angle.

The lower surface of the front upturned section is 34 and the lower surface of the rear upturned section is 36 are also smooth. It is apparent from viewing FIGS. 3 through 5 that the lower surface 30 is entirely smooth and flat with no ridges or bumps and the lowermost lengthwise portion of the surface 32 is completely flat and smoothly extends into lower surface 34 and lower surface 36 so that as the device is slid along a surface, the device can be tilted upwardly so that surface 34 extends on the bottom of the ground or is tilted rearwardly so that surface 36 extends on the bottom of the ground to thereby simulate skateboarding.

In one embodiment, the entire device is made of a solid piece of material. In an alternative embodiment, the interior of the device 40 has one or more hollow sections such as section 42 as illustrated in FIG. 8, which hollow section 42 contains noisemaking devices 44 such as beads, pebbles, or sand. The hollow section 42 can run the entire length of the center portion of the device or it can also run for a portion of the length of the center portion of the device, or there can be several separated hollow sections within the center portion of the device. Also, it is within the spirit and scope of the present invention to have the hollow section run on the front portion of the device bounded by front edge 24 or within the rear portion of the device bounded by rear edge 26.

In practice, a child can place on of his/her feet on the upper surface of the device 10 such as lowered section 14 and push along the surface of the ground with his/her other foot to cause the practice device 10 to move. When pushed in one direction, the device moves forwardly and when pushed in the other direction, the device moves rearwardly. The device can also be caused to move side to side.

Figure 9:
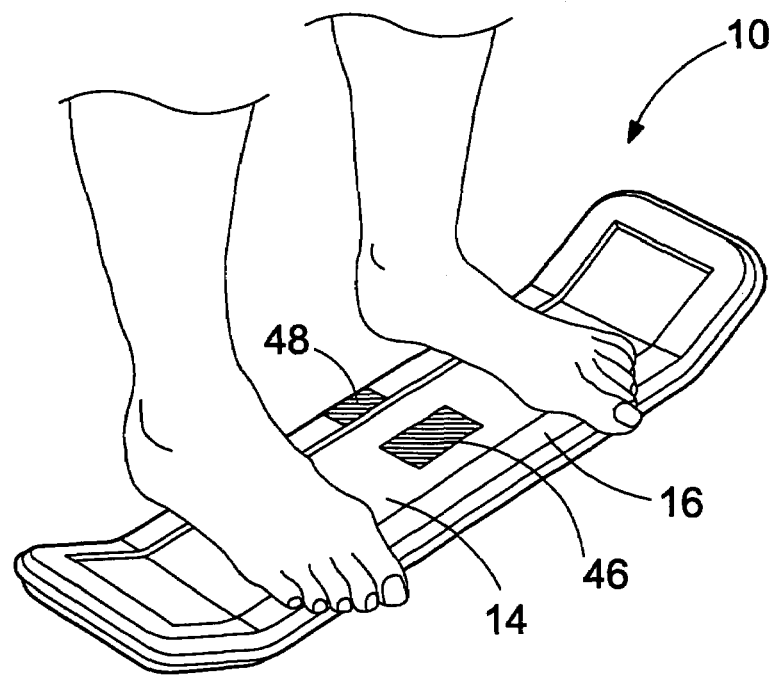
FIG. 9 is a perspective view of the present invention practice device showing a child placing his feet transverse to the present invention practice device so that the balls of the child's feet rest adjacent the intersection of the portion of the ridge and the lowered central surface.

The child can also place his/her feet transverse to the lengthwise edge of the upper section as illustrated in FIG. 9. In this manner, the balls of the child's feet can rest at the vertical wall 18 at the intersection of the lower section 14 and the ridge 16 to provide better traction and balance as a child moves the board with body motions to simulate skateboarding. Alternatively, the rear of the child's feet can rest at the intersection wall 18 where the lower section 14 meets the ridge 16.

Because of the flat surface 30, and especially center section 32, the practice device 10 can easily slide on any type of reasonably smooth surface such as grass, carpet, a wood floor, a linoleum floor, dirt, and even a bed. The fact that the lower portion 34 of the front section and the lower portion 36 of the rear section are also flat and smooth can also facilitate the board being ridden on these surfaces as well to further simulate a skateboard. In addition, the lowered center section 14 and the ridge 16 provide better traction and security for the child to safely move on the board and to practice skateboarding. The fact that the front edge 24 and the rear edge 26 are each extended at an angle above the lower surface of approximately 45 degrees prevents the practice device 10 from flipping over to provide additional safety to the child. While 45 degrees is the preferred angle, an angle between 30 degrees and 50 degrees are within the spirit and scope of the present invention for the front portion and also for the rear portion relative to the center section.

The optional feature of having one or more hollow interior compartments within the practice device which house noisemaking devices such as beads, pebbles or sand adds further enjoyment to the child as motion of the board will simulate a wave motion noise.

In the preferred embodiment, the practice device 10 is manufactured out of any one or more of conventional plastic material such as polyethylene and polypropylene or polyvinyl. It is also within the spirit and scope of the present invention to make the practice device out of any other type of safe structural material such as wood or metal or even strong cardboard or styrofoam. However, plastic or any one of the plastic derivatives is the preferred material out of which the board is made as the device can then be easily molded.

It is also within the spirit and scope of the present invention to have the device made of more than one material such as the center section on the top being made of one type of material and the ridge and exterior circumferential section composed of the ridge being made of another piece of material.

Further, to add additional traction, one or more grip pads 46 can be placed on the lowered section 14 of upper surface 12 so that the feet can be placed on the grip pads 14 to add more traction. While only one grip pad 14 is illustrated in FIG. 9, it will be appreciated that the lower surface 14 can have a grip pad or there can be a multiplicity of separated smaller grip pads along the lower surface 14.

It is also within the spirit and scope of the present invention to have the grip pads on the one or more portions of the ridge as illustrated in FIG. 9 where grip pad 48 is on a portion of the ridge 16.

Defined in detail, the present invention is a practice device to simulate skateboarding, comprising: (a) an elongated structure having a center section, a front section and a rear section, with the three sections having an adjoining upper surface and an adjoining lower surface; (b) the center section having a lower surface which is a smooth surface; (c) the front section extending at a 45 degree angle to the center section and the rear section extending at a 45 degree angle to the center section; (d) the upper surface of all three sections having a lowered interior area and a circumferential ridge extending along the circumference of the upper surface and extending inwardly such that a vertical wall is formed at the intersection of the interior portion of the circumferential ridge and the lowered interior area; and (e) the structure having at least one interior hollow chamber containing noisemaking material within the chamber.

Defined broadly, the present invention is a practice device to simulate skateboarding, comprising: (a) an elongated structure having a center section, a front section and a rear section, with the three sections having an adjoining upper surface and an adjoining lower surface; (b) a center section having a lower surface which is a smooth surface; (c) a front section extending at a 45 degree angle to the center section and the rear section extending at a 45 degree angle to the center section; and (d) an upper surface of all three sections having a lowered interior area and a circumferential ridge extending along the circumference of the upper surface and extending inwardly such that a vertical wall is formed at the intersection of the interior portion of the circumferential ridge and the lowered interior area.

Defined more broadly, the present invention is a practice device to simulate skateboarding, comprising: (a) an elongated structure having a center section, a front section and a rear section, with the three sections having an adjoining upper surface and an adjoining lower surface; (b) the center section having a lower surface which is a smooth surface; (c) the front section extending at an angle between 30 degrees and 50 degrees to the center section and the rear section extending at an angle between 30 degrees and 50 degrees to the center section; and (d) the upper surface of all three sections having a lowered interior area and a ridge extending along at least a portion of the circumference of the upper surface and extending inwardly such that the ridge adjoins the lowered interior area.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A practice device to simulate skateboarding, comprising:
   a. an elongated structure having a center section, a front section and a rear section, with the three sections having an adjoining upper surface and an adjoining lower surface;
   b. the center section having a lower surface which is a smooth surface;
   c. the front section extending at a 45 degree angle to the center section and the rear section extending at a 45 degree angle to the center section;
   d. the upper surface of all three sections having a lowered interior area and a circumferential ridge extending along the circumference of the upper surface and extending inwardly such that a vertical wall is formed at the intersection of the interior portion of the circumferential ridge and the lowered interior area; and
   e. the structure having at least one interior hollow chamber containing noisemaking material within the chamber.

2. A practice device to simulate skateboarding in accordance with claim 1, wherein said noisemaking material is sand.

3. A practice device to simulate skateboarding in accordance with claim 1, wherein said noisemaking material is beads.

4. A practice device to simulate skateboarding in accordance with claim 1, wherein the device is made of plastic.

5. A practice device to simulate skateboarding in accordance with claim 1, further comprising at least one grip pad on the lowered interior area of the upper surface.

6. A practice device to simulate skateboarding in accordance with claim 1, further comprising at least one grip pad on the circumferential ridge on the upper surface.

7. A practice device to simulate skateboarding, comprising:
   a. an elongated structure having a center section, a front section and a rear section, with the three sections having an adjoining upper surface and an adjoining lower surface;
   b. a center section having a lower surface which is a smooth surface;
   c. a front section extending at a 45 degree angle to the center section and the rear section extending at a 45 degree angle to the center section; and
   d. an upper surface of all three sections having a lowered interior area and a circumferential ridge extending along the circumference of the upper surface and extending inwardly such that a vertical wall is formed at the intersection of the interior portion of the circumferential ridge and the lowered interior area.

8. A practice device to simulate skateboarding in accordance with claim 7, wherein the device is made of plastic.

9. A practice device to simulate skateboarding in accordance with claim 7, further comprising at least one grip pad on the lowered interior area of the upper surface.

10. A practice device to simulate skateboarding in accordance with claim 7, further comprising at least one grip pad on the circumferential ridge on the upper surface.

11. A practice device to simulate skateboarding, comprising:
    a. an elongated structure having a center section, a front section and a rear section, with the three sections having an adjoining upper surface and an adjoining lower surface;
    b. the center section having a lower surface which is a smooth surface;
    c. the front section extending at an angle between 30 degrees and 50 degrees to the center section and the rear section extending at an angle between 30 degrees and 50 degrees to the center section; and
    d. the upper surface of all three sections having a lowered interior area and a ridge extending along at least a portion of the circumference of the upper surface and extending inwardly such that a vertical wall is formed at the intersection of the interior portion of the ridge and the lowered interior area.

12. A practice device to simulate skateboarding in accordance with claim 11, further comprising the structure having at least one interior hollow chamber containing noisemaking material within the chamber.

13. A practice device to simulate skateboarding in accordance with claim 12, wherein said noisemaking material is sand.

14. A practice device to simulate skateboarding in accordance with claim 12, wherein said noisemaking material is beads.

15. A practice device to simulate skateboarding in accordance with claim 11, wherein the device is made of plastic.

16. A practice device to simulate skateboarding in accordance with claim 11, further comprising at least one grip pad on the lowered interior area of the upper surface.

* * * * *